US012663001B2

(12) United States Patent
Budampati et al.

(10) Patent No.: US 12,663,001 B2
(45) Date of Patent: Jun. 23, 2026

(54) PUMP HEALTH MONITORING SYSTEM

(71) Applicant: PENTAIR WATER POOL AND SPA, INC., Cary, NC (US)

(72) Inventors: Ramakrishna Budampati, Woodbury, MN (US); Philip Rolchigo, Cary, NC (US); Mohan Khadilkar, Cary, NC (US); John Tanner, Cary, NC (US); Edward Brown, Thousand Oaks, CA (US); Azur Dzindo, Woodland Hills, CA (US)

(73) Assignee: PENTAIR WATER POOL AND SPA, INC., Cary, NC (US)

( * ) Notice: Subject to any disclaimer, the term of this patent is extended or adjusted under 35 U.S.C. 154(b) by 282 days.

(21) Appl. No.: 18/554,441

(22) PCT Filed: Apr. 7, 2022

(86) PCT No.: PCT/US2022/071607
§ 371 (c)(1),
(2) Date: Oct. 6, 2023

(87) PCT Pub. No.: WO2022/217262
PCT Pub. Date: Oct. 13, 2022

(65) Prior Publication Data
US 2024/0200552 A1    Jun. 20, 2024

Related U.S. Application Data

(60) Provisional application No. 63/362,175, filed on Mar. 30, 2022, provisional application No. 63/200,983, filed on Apr. 7, 2021.

(51) Int. Cl.
*F04B 49/06* (2006.01)
*F04B 51/00* (2006.01)
*G01M 13/045* (2019.01)

(52) U.S. Cl.
CPC ............ *F04B 49/065* (2013.01); *F04B 51/00* (2013.01); *G01M 13/045* (2013.01)

(58) Field of Classification Search
CPC ..... F04B 49/065; F04B 51/00; G01M 13/045; G01M 7/00; F04D 15/0088
See application file for complete search history.

(56) References Cited

U.S. PATENT DOCUMENTS 6,829,542 B1    12/2004  Reynolds et al.
8,874,383 B2 *  10/2014  Gambier ............... F04B 49/065
                                                            340/572.1

(Continued)

OTHER PUBLICATIONS

Extended European Search Report for corresponding European Application No. 22785652.3, dated Jan. 31, 2025, 9 pages.

(Continued)

*Primary Examiner* — Francis C Gray
(74) *Attorney, Agent, or Firm* — Husch Blackwell LLP

(57) ABSTRACT

A pump health monitoring system is provided. Such a system includes one or a plurality of data capture devices that together collect a multiple variable data set relating to a device being monitored such as a water pump device for a pool or spa and/or an underwater submerged pump device. A programmable processor receives the multiple variable data set, retrieves a set of processing rules that are specific to the identity of the pump and processes the operating details with the set of processing rules to identify a current operational status or health status of the device.

15 Claims, 6 Drawing Sheets

(56) References Cited

U.S. PATENT DOCUMENTS

| | | | |
|---|---|---|---|
| 9,051,945 | B2 | 6/2015 | Hague |
| 10,920,769 | B2 * | 2/2021 | Rosca ..................... F04B 49/20 |
| 2012/0325460 | A1 * | 12/2012 | Lisk ................... F04D 15/0088 |
| | | | 166/250.01 |
| 2015/0354326 | A1 * | 12/2015 | Lisk ........................ F04D 13/10 |
| | | | 166/53 |
| 2017/0248142 | A1 | 8/2017 | Munk et al. |
| 2018/0189962 | A1 | 7/2018 | Helbo Nygaard |
| 2018/0320684 | A1 | 11/2018 | Rosca et al. |
| 2019/0353156 | A1 * | 11/2019 | Ward ................... F04B 49/065 |

OTHER PUBLICATIONS

International Search Report and Written Opinion issued for PCT/US22/71607, dated Jul. 19, 2022, 22 pages.

* cited by examiner

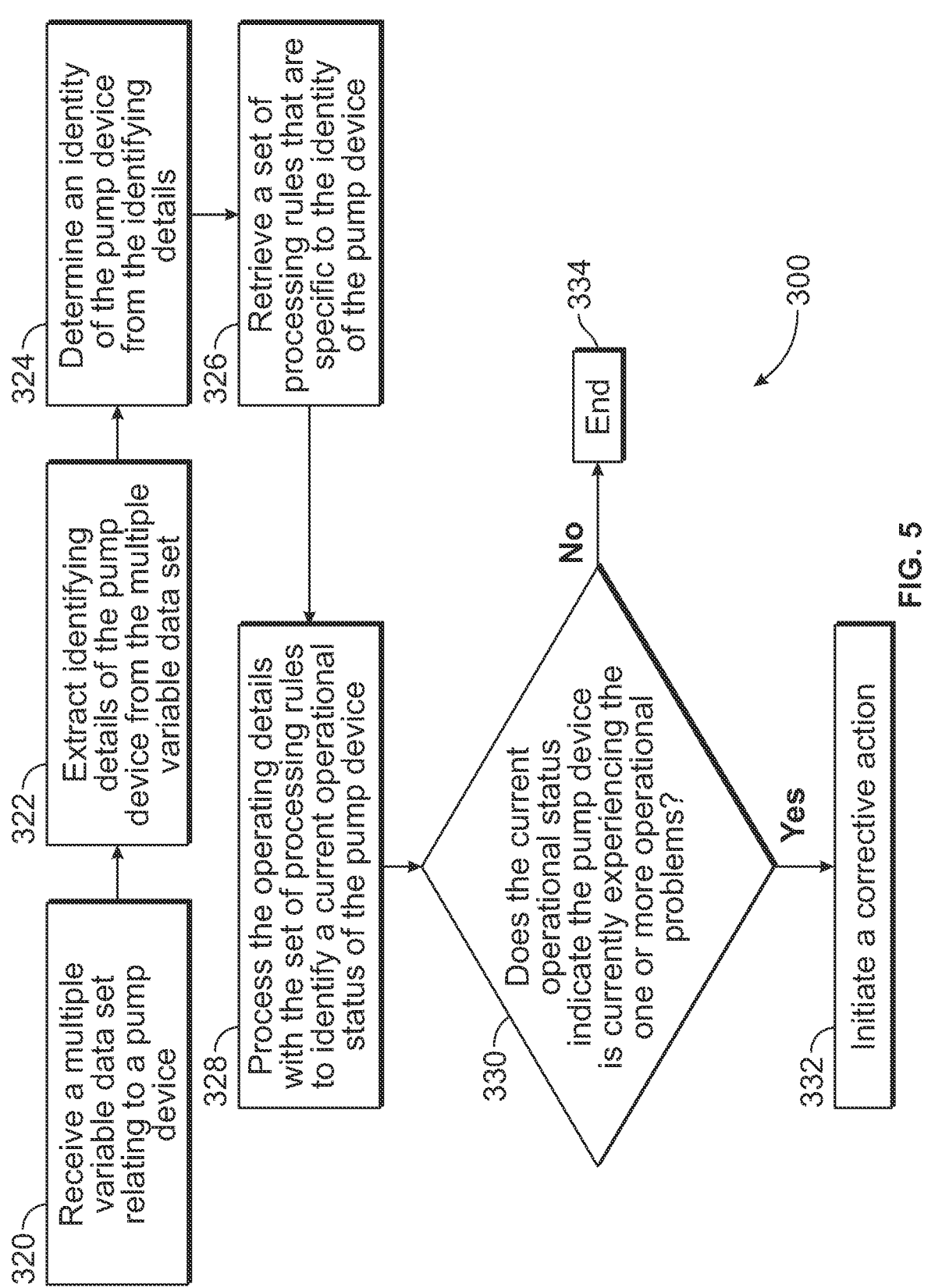

320 Receive a multiple variable data set relating to a pump device

322 Extract identifying details of the pump device from the multiple variable data set 324 Determine an identity of the pump device from the identifying details 326 Retrieve a set of processing rules that are specific to the identity of the pump device 328 Process the operating details with the set of processing rules to identify a current operational status of the pump device 330 Does the current operational status indicate the pump device is currently experiencing the one or more operational problems?

No → End 334

Yes

332 Initiate a corrective action

PUMP HEALTH MONITORING SYSTEM

CROSS REFERENCE TO RELATED APPLICATIONS

This application is a national stage application claiming priority to PCT International Patent Application No. PCT/US2022/71607 filed Apr. 7, 2022, titled "PUMP HEALTH MONITORING SYSTEM", which claims priority to U.S. Application No. 63/200,983 filed Apr. 7, 2021, titled "PUMP HEALTH MONITORING SYSTEM, " and further claims priority to U.S. Application No. 63/362,175 filed Mar. 30, 2022, titled "SENSOR SYSTEM FOR HEALTH MONITORING OF UNDER WATER SYSTEM," which are hereby fully incorporated by reference as if set forth fully herein.

BACKGROUND

Systems for monitoring the heath and functionality of water pumps is an ongoing consumer need. In particular, there is an ongoing need to monitor water pumps and the interconnected systems for one or more maintenance conditions.

Some known systems for monitoring the heath and functionality of water pumps include single variable dedicated sensors that are complicated to set up and are separately purchased and installed on/or proximate to the pump to provide the needed functionality. Some other known solutions have employed existing user devices such as mobile phones to capture a single variable such as ambient sound for processing to identify a current operating status of the pump. However, monitoring only a single variable can produce either an inaccurate assessment of the current operating status of a pump, and/or a produce an assessment that lacks sufficient detail to identify individual operating problems with particularity.

Furthermore, monitoring the health of equipment deployed in an underwater environment or facility is an additional related ongoing consumer need. In particular, conventional types of equipment or machinery generally perform long hours of work in or at an underwater facility or structure. This equipment generally becomes less functional after regular use. Naturally, however, faults and failures occur within these complex pieces of equipment. Intervention operations to recover failed modules may be extremely costly and the availability of vessels to perform these operations at short notice may be limited.

The underwater structure or underwater body may comprise of subsea unit, a pool cleaner, a hydraulic hose, and/or a submersible (electric) pump, etc. The underwater structure may be deployed for any of a variety of pumping purposes and include motors that operate in harsh environments that may fail over time. Even if such equipment does not completely fail, the performance of the motor and components may be impaired due to, for example, mechanical wear or failure caused by bearing wear, impeller wear, and the like, as well as electrical failures. If an underwater structure fails during operation, the underwater structure must be removed from the pumping environment and replaced or repaired, either of which results in a significant cost to an operator.

An existing approach towards detecting such failures is to utilize sensors fitted to the underwater equipment to measure various parameters within the electrical/electronic, hydraulic, chemical, and production systems. In various applications, sensors or other detectors are used to detect failures.

Additionally, some well-related underwater or subsea applications employ sensors to monitor aspects of the operation, and surveillance engineers are employed to monitor the data and to make decisions based on that data. However, such techniques may not address underwater structure system issues soon enough and may be subject to errors, including raising false alarms or missed maintenance reminders, which may result in system malfunction.

Another known challenge in underwater systems having an integrated sensor and display unit is that the existing integrated sensor systems are limited to a specific product or for a single use. A customer can only utilize the sensors one time as they are attached to the product and expire after the lifecycle is complete. A user cannot use it for other machines or devices. The conventional designed sensor unit is unsatisfactory because it is specific to a single product only and typically needs some assembly instruction as well as technicians to install the units.

Additionally, conventional systems may be provided with built-in protection features like short circuit or open circuit in a current sensor and different uses based on different functions of other sensors. These protections are designed to identify installation errors, electrical connection, locked condition or an open condition by a user or technician etc. The conventional systems protection features however are not able to detect the behavior changes of the underwater system due to ageing, heating, premature faults, and/or disturbances that occur due to water turbulence during operation.

In light of these deficiencies, there is a need for improved systems and methods. In particular, there is need for improved data gathering, processing systems, and methods for diagnosing the health of a pump system. Furthermore, there is a need to provide an improved sensor system that can work with multiple pump systems and not only for single product use, and that is easily removed, mounted, and reused from one system to another system to monitor the health and diagnostic conditions of an underwater system or component. Therefore, there is a need for a sensor system that can be easily removed and reused on other products having similar features or functions.

SUMMARY

Embodiments described herein are directed to a pump health monitoring system that comprises a plurality of data capture devices that together collect a multiple variable data set relating to a pump device. The multiple variable data set includes at least one or more identifying details of the pump device and one or more operating details of the pump device. The pump health monitoring system further comprises a first programmable processor that receives the multiple variable data set, extracts the identifying details from the multiple variable data set, determines an identity of the pump device from the identifying details, retrieves a set of processing rules that are specific to the identity of the pump device, and processes the operating details with the set of processing rules to identify a current operational status of the pump device. The first programmable processor also initiates display of information documenting one or more operational problems on a display device when the current operational status indicates that the pump device is currently experiencing the one or more operational problems.

In some embodiments, the pump health monitoring system further comprises a user device that includes one or more, or plurality of data capture devices, the first programmable processor, and the display device.

In some embodiments, the pump health monitoring system further comprises a user device that includes the plurality of data capture devices, a second programmable processor, the display device, and a network interface device that connects the second programmable processor to the first programmable processor. In these embodiments, the second programmable processor receives the multiple variable data set from the plurality of data capture devices and transmits the multiple variable data set to the first programmable processor via the network interface device.

In some embodiments, the pump health monitoring system further comprises a cloud server that that includes the first programmable processor. In these embodiments, the cloud server is located remotely from the pump device.

In some embodiments of the pump health monitoring system, the plurality of data capture devices include a microphone, a camera, and a vibration sensor. In these embodiments, the multiple variable data set includes a combination of one or more of ambient audio of the pump device collected by the microphone, static images and/or video images of the pump device collected by the camera, and vibration patterns of the pump device collected by the vibration sensor. Furthermore, the set of processing rules direct the first programmable processor to identify one or more context variables from respective contents of the static images and/or the video images. In some embodiments, the set of processing rules direct the first programmable processor to combine the one or more context variables, the ambient audio, and the vibration patterns into a comparison group, identify one of a plurality of multivariable groups stored in a memory device that best matches the comparison group, and identify the current operational status as a respective known operational status associated with the one of the plurality of multivariable groups. Additionally or alternatively, in some embodiments, the set of processing rules direct the first programmable processor to combine the one or more context variables into a comparison group, identify one of a plurality of known context variable groups stored in a memory device that best matches the comparison group, identify one of a plurality of known ambient audio recordings stored in the memory device that best matches the ambient audio captured by the microphone, identify one of a plurality of known vibration patterns stored in the memory device that best matches the vibration patterns captured by the vibration sensor, and identify the current operational status as a combination of respective known operational statuses associated with the one of the plurality of known context variable groups, the one of the plurality of known ambient audio recordings, and the one of the plurality of known vibration patterns.

In some embodiments of the pump health monitoring system, the set of processing rules direct the first programmable processor to identify one of a plurality of multivariable groups stored in the memory device that best matches the operating details, and identify the current operational status as a respective known operational status associated with the one of the plurality of multivariable groups.

In some embodiments of the pump health monitoring system, the set of processing rules direct the first programmable processor to filter the multiple variable data set into a plurality of subsets that each correspond to a different respective data type, identify a respective one of a plurality of known variables stored in a memory device that best matches each one of the plurality of subsets, and identify the current operational status as a combination of respective known operational statuses associated with the respective one of the plurality of known variables identified as the best match for each one of the plurality of subsets.

In some embodiments of the pump health monitoring system, each entry in the multiple variable data set includes an embedded time stamp. In these embodiments, the first programmable processor synchronizes each entry in the multiple variable data set in time using the embedded time stamp to identify simultaneously occurring events.

In some embodiments of the pump health monitoring system, the information documenting the one or more operational problems includes a listing of steps to correct and/or trouble shoot the one or more operational problems.

In some embodiments of the pump health monitoring system, the information documenting the one or more operational problems includes contact information for and/or activatable links to initiate contact with one or more service technicians that are capable of correcting the operational problems.

In some embodiments of the pump health monitoring system, the first programmable processor identifies one or more of replacement pumps and additional addon components for the pump device that will limit or remedy the proposed issue when the current operational status fails to indicate that the pump device is currently experiencing the one or more operational problems and the first programmable processor receives user input indicating a proposed issue that is consistent with normal operation of the pump device.

In some embodiments of the pump health monitoring system, the first programmable processor controls one or more of a drive of the pump device and water flow to the pump device to correct the one or more operational problems when the current operational status indicates that the pump device is currently experiencing the one or more operational problems.

In some embodiments of the pump health monitoring system, the set of processing rules are derived from a machine learning training procedure.

In some embodiments of the pump health monitoring system, the set of processing rules include a multiple stage process that includes a first stage that directs the programmable processor to retrieve normal operating details that are specific to the identity of the pump device and compare the operating details with the normal operating details. The multiple stage process also includes a second stage that identifies the current operational status of the pump device. In some embodiments, the second stage is activated when an output of the first stage indicates that the operating details deviate from the normal operating details beyond a threshold amount.

Embodiments described herein are also directed to a method for monitoring health of a pump system. The method comprising receiving a multiple variable data set relating to a pump device and including at least one or more identifying details of the pump device and one or more operating details of the pump device. The method also includes extracting the identifying details from the multiple variable data set, determining an identity of the pump device from the identifying details, retrieving a set of processing rules that are specific to the identity of the pump device, processing the operating details with the set of processing rules to identify a current operational status of the pump device, and initiating a corrective action when the current operational status indicates that the pump device is currently experiencing the one or more operational problems.

In some embodiments of the method for monitoring health of a pump system, the corrective action incudes initiating display of information documenting one or more operational problems on a display device when the current operational status indicates that the pump device is currently experiencing the one or more operational problems. In some embodiments, the information documenting the one or more operational problems includes a listing of steps to correct and/or trouble shoot the one or more operational problems. Additionally or alternatively, in some embodiments, the information documenting the one or more operational problems includes contact information for or activatable links to initiate contact with one or more service technicians that are capable of correcting the operational problems.

In some embodiments, the method for monitoring health of a pump system further comprises receiving the multiple variable data set from a plurality of data capture devices and transmitting the multiple variable data set to a first programmable processor via a network interface device. In some embodiments, the first programmable processor is in communication with a cloud server that is located remotely from the pump device.

In some embodiments, the method for monitoring health of a pump system further comprises capturing the multiple variable data set with a plurality of data capture devices integrated into a user device. In some embodiments of the method for monitoring health of a pump system, the plurality of data capture devices include one or more of a microphone, a camera, and a vibration sensor, and wherein the multiple variable data set includes ambient audio of the pump device collected by the microphone, static image(s) and/or video image(s) of the pump device collected by the camera, and vibration patterns of the pump device collected by the vibration sensor. Furthermore, in some embodiments, the method includes using the set of processing rules to identify one or more context variables from respective contents of the static images and/or the video images. In some embodiments, the method includes using the set of processing rules to combine the one or more context variables, the ambient audio, and the vibration patterns into a comparison group, identify one of a plurality of multivariable groups stored in a memory device that best matches the comparison group, and identify the current operational status as a respective known operational status associated with the one of the plurality of multivariable groups. Additionally or alternatively, in some embodiments, the method includes using the set of processing rules to combine the one or more context variables into a comparison group, identify one of a plurality of known context variable groups stored in a memory device that best matches the comparison group, identify one of a plurality of known ambient audio recordings stored in the memory device that best matches the ambient audio captured by the microphone, identify one of a plurality of known vibration patterns stored in the memory device that best matches the vibration patterns captured by the vibration sensor, and identify the current operational status as a combination of respective known operational statuses associated with the one of the plurality of known context variable groups, the one of the plurality of known ambient audio recordings, and the one of the plurality of known vibration patterns.

In some embodiments, the method includes using the set of processing rules to identify one of a plurality of multi-variable groups stored in the memory device that best matches the operating details, and identify the current operational status as a respective known operational status associated with the one of the plurality of multivariable groups.

In some embodiments, the method includes using the set of processing rules to filter the multiple variable data set into a plurality of subsets that each correspond to a different respective data type, identify a respective one of a plurality of known variables stored in a memory device that best matches each one of the plurality of subsets, and identify the current operational status as a combination of respective known operational statuses associated with the respective one of the plurality of known variables identified as the best match for each one of the plurality of subsets.

In some embodiments of the method for monitoring health of a pump system, each entry in the multiple variable data set includes an embedded time stamp. In these embodiments, the method includes synchronizing each entry in the multiple variable data set in time using the embedded time stamp to identify simultaneously occurring events.

In some embodiments of the method for monitoring health of a pump system, when the current operational status fails to indicate that the pump device is currently experiencing one or more operational problems and user input indicating a proposed issue that is consistent with normal operation of the pump device is received, the method includes identifying one or more of replacement pumps and additional addon components for the pump device that will limit or remedy the proposed issue.

In some embodiments of the method for monitoring health of a pump system, the corrective action incudes controlling one or more of a drive of the pump device and water flow to the pump device to correct the one or more operational problems.

In some embodiments of the method for monitoring health of a pump system, the set of processing rules are derived from a machine learning training procedure.

In some embodiments, the method for monitoring health of a pump system further includes the steps of processing the set of processing rules in a multiple stage process that includes a first stage that includes retrieving normal operating details that are specific to the identity of the pump device and comparing the operating details with the normal operating details. The multiple stage process also includes a second stage that includes identifying the current operational status of the pump device. In some embodiments, the method includes activating the second stage when an output of the first stage indicates that the operating details deviate from the normal operating details beyond a threshold amount.

Embodiments described herein are also directed to a pump health monitoring system that comprises a user device including a user device processor, a first network interface, a plurality of (or one or more) data capture devices, and a user device non-transitory computer readable medium. The system also comprises a cloud server including a cloud server processor, a second network interface, and a cloud server non-transitory computer readable medium. A communication link operatively connects the user device and the cloud server via the first network interface and the second network interface. First program instructions are stored on the user device non-transitory computer readable medium. The first program instructions are executable by the user device processor to cause the user device to perform step of capturing a multiple variable data set relating to a pump device with the plurality of data capture devices. The multiple variable data set includes at least identifying details of the pump device and operating details of the pump device. The first program instructions are also executable by the user device processor to cause the user device to perform steps of sending the multiple variable data set to the to the cloud server via the communication link, receiving information documenting one or more operational problems of the pump device from the cloud server, and displaying the information documenting the one or more operational problems of the pump device on a display of the user device. The system also comprises second program instructions stored on the cloud server non-transitory computer readable medium. The second program instructions are executable by the cloud server processor to cause the cloud server to perform steps of receiving the multiple variable data set from the user device, extracting the identifying details from the multiple variable data set, determining an identity of the pump device from the identifying details, retrieving a set of processing rules that are specific to the identity of the pump device from a memory device coupled to the cloud server, processing the operating details with the set of processing rules to identify a current operational status of the pump device, and sending the information documenting the one or more operational problems of the pump device to the user device via the communication link when the current operational status indicates that the pump device is currently experiencing the one or more operational problems.

In some embodiments of the pump health monitoring system, the plurality of data capture devices include one or more of a microphone, a camera, and a vibration sensor. In these embodiments, the multiple variable data set includes one or more of a combination of ambient audio of the pump device collected by the microphone, static image(s) and/or video image(s) of the pump device collected by the camera, and vibration patterns of the pump device collected by the vibration sensor. Furthermore, in some embodiments, processing the operating details with the set of processing rules includes identifying one or more context variables from respective contents of the static image(s) and/or the video image(s). Further still, in some embodiments, processing the operating details with the set of processing rules includes combining the one or more context variables, the ambient audio, and the vibration patterns into a comparison group, identifying one of a plurality of multivariable groups stored in a memory device that best matches the comparison group, and identifying the current operational status as a respective known operational status associated with the one of the plurality of multivariable groups. Additionally or alternatively, in some embodiments, processing the operating details with the set of processing rules includes combining the one or more context variables into a comparison group, identifying one of a plurality of known context variable groups stored in a memory device that best matches the comparison group, identifying one of a plurality of known ambient audio recordings stored in the memory device that best matches the ambient audio captured by the microphone, identifying one of a plurality of known vibration patterns stored in the memory device that best matches the vibration patterns captured by the vibration sensor, and identifying the current operational status as a combination of respective known operational statuses associated with the one of the plurality of known context variable groups, the one of the plurality of known ambient audio recordings, and the one of the plurality of known vibration patterns.

In some embodiments of the pump health monitoring system, processing the operating details with the set of processing rules includes identifying one of a plurality of multivariable groups stored in the memory device that best matches the operating details, and identifying the current operational status as a respective known operational status associated with the one of the plurality of multivariable groups.

In some embodiments of the pump health monitoring system, processing the operating details with the set of processing rules includes filtering the multiple variable data set into a plurality of subsets that each correspond to a different respective data type, identifying a respective one of a plurality of known variables stored in a memory device that best matches each one of the plurality of subsets, and identifying the current operational status as a combination of respective known operational statuses associated with the respective one of the plurality of known variables identified as the best match for each one of the plurality of subsets.

In some embodiments of the pump health monitoring system, each entry in the multiple variable data set includes an embedded time stamp. In these embodiments, the second program instructions are executable by the cloud server processor to cause the cloud server to perform step of synchronizing each entry in the multiple variable data set in time using the embedded time stamp to identify simultaneously occurring events. Additionally or alternatively, in some embodiments, the first program instructions are executable by the user device processor to cause the user device to perform the step of synchronizing each entry in the multiple variable data set in time using the embedded time stamp to identify simultaneously occurring events.

In some embodiments of the pump health monitoring system, the information documenting the one or more operational problems includes a listing of steps to correct and/or trouble shoot the one or more operational problems.

In some embodiments of the pump health monitoring system, the information documenting the one or more operational problems includes contact information for or activatable links to initiate contact with one or more service technicians that are capable of correcting the operational problems.

In some embodiments of the pump health monitoring system, the first program instructions are further executable by the user device processor to cause the user device to perform the step of receiving user input indicating a proposed issue that is consistent with normal operation of the pump device. In these embodiments, the second program instructions are executable by the cloud server processor to cause the cloud server to perform the step of identifying one or more of replacement pumps and/or additional addon component(s) for the pump device that will limit or remedy the proposed issue when the current operational status fails to indicate that the pump device is currently experiencing the one or more operational problems and the user input is received. Additionally or alternatively, in some embodiments, the first program instructions are executable by the user device processor to cause the user device to perform the step of identifying one or more of replacement pumps and additional addon components for the pump device that will limit or remedy the proposed issue when the current operational status fails to indicate that the pump device is currently experiencing the one or more operational problems and the user input is received.

In some embodiments of the pump health monitoring system, the first program instructions are further executable by the user device processor to cause the user device to perform step of controlling one or more of a drive of the pump device and water flow to the pump device to correct the one or more operational problems when the current operational status indicates that the pump device is currently experiencing the one or more operational problems. Additionally or alternatively, in some embodiments, the second program instructions are further executable by the cloud server processor to cause the user device to perform step of controlling one or more of a drive of the pump device and water flow to the pump device to correct the one or more operational problems when the current operational status indicates that the pump device is currently experiencing the one or more operational problems.

In some embodiments of the pump health monitoring system, the set of processing rules are derived from a machine learning training procedure.

In some embodiments of the pump health monitoring system, processing the operating details with the set of processing rules includes a multiple stage process having a first stage and a second stage. For the first stage, the second program instructions are further executable by the cloud server processor to cause the cloud server to perform steps of retrieving normal operating details that are specific to the identity of the pump device and comparing the operating details with the normal operating details. For the second stage, the second program instructions are further executable by the cloud server processor to cause the cloud server to perform step of identifying the current operational status of the pump device. In some embodiments, the second program instructions are further executable by the cloud server processor to cause the cloud server to perform steps of activating the second stage when an output of the first stage indicates that the operating details deviate from the normal operating details beyond a threshold amount.

Embodiments described herein are also directed to an improved sensor system for preventive and predictive maintenance in real-time. The sensor system is removably attached to any device for multiple uses and in different positions. A user can evaluate any disturbance in the product's assembly and other conditions such as vibration, overloaded, heating issues, etc.

A method that allows a reliable health monitoring of an underwater structure is also provided so as to provide a piece of underwater equipment that can be operated safely and reliably and that has an extended lifespan in comparison to known prior art systems.

Embodiments described herein are also directed to a sensor system for health monitoring of underwater structures submerged in a body of water. The system for monitoring the health of an underwater structure includes a sensor unit to measure various parameters of the underwater structure. The sensor unit is removably attached to the underwater structure. A control unit is communicatively coupled to the sensor unit and processes data provided thereto from the sensor unit. The system also includes a display unit connected to the control unit to present information provided by the controller unit. In some embodiments, a remote device is communicatively coupled to the control unit. The sensor unit includes one or more of a temperature sensor, pressure sensor, gyro, accelerometer, vibration sensor, flow sensor, current sensor, voltage sensor, power sensor, energy sensor, or combination thereof. The sensor unit is placed in more than one location of the underwater structure so as to collect data from a variety of location. Further, the sensor unit is mounted on the underwater structure surface with an attachment mechanism such as a small belt, screw, clamp, conductive glue, magnets, or clip-on. The control unit of the sensor system determines the status of the underwater structure by extracting a plurality of different features from the data provided by the sensing unit.

Further, in some embodiments, the display unit delivers a warning message locally in the event of any error in the sensor unit data. For example, a warning message is displayed locally on the display unit. Moreover, in some embodiments, the sensor unit sends alerts or reminders to remotely to a remote device. The remote device controls the sensor system remotely. In some embodiments, the remote device uses an application to monitor the status of the underwater water structure. The sensor unit can be connected wired or wirelessly to the control unit. Furthermore, in some embodiment, the underwater structure comprises one or more of a submersible pump, hydraulic hose, subsea unit, pool cleaners, water pump, and other underwater equipment known in the art.

DESCRIPTION OF THE DRAWINGS

FIG. 5 is a flow diagram of a method according to disclosed embodiments;

DETAILED DESCRIPTION

Figure 1:
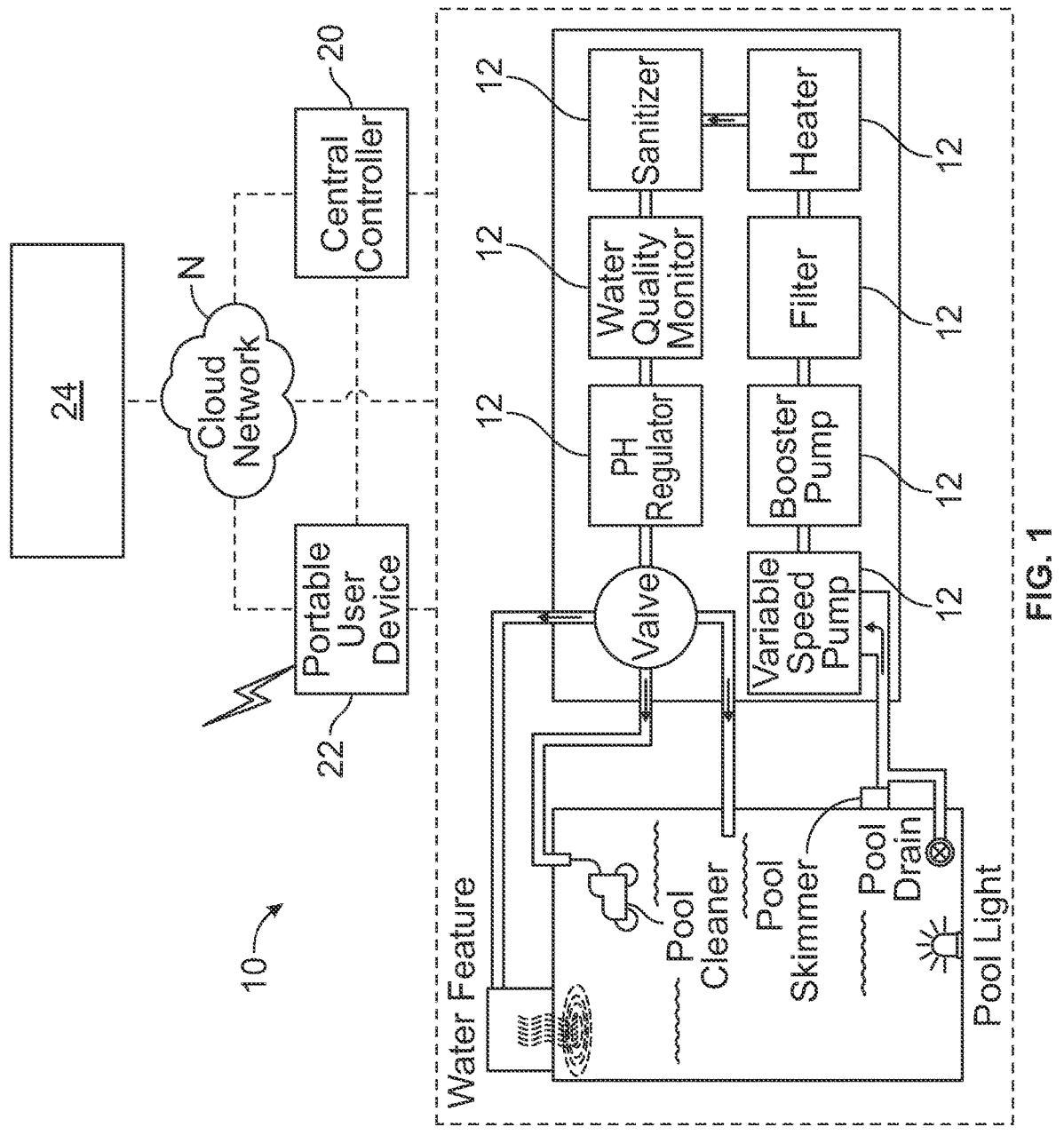
FIG. 1 is a schematic diagram of a connected pool system according to disclosed embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an exemplary connected aquatic application, such as a pool or spa system 10, according to disclosed embodiments. As seen in FIG. 1, the connected pool or spa system 10 can include a plurality of components 12, a central controller 20, a user device 22, and a cloud server 24. In some embodiments, the plurality of components 12 can be connected to and controlled by one or more of the user device 22, the central controller 20, and/or the cloud server 24. Furthermore, the plurality of components 12 can include one or more of, for example, a heater, a filter, a booster pump, a variable speed pump, one or more sensors and/or valves, a pH and/or water chemistry regulation mechanism, a water quality monitor, a sanitizer, various communication enabling devices, and/or other electrically controllable pool or spa related devices such as known in the art. The plurality of components 12 are provided in communication with each other and the pool to form a fluid circuit. The fluid circuit facilitates water movement from the pool or spa through one or more of the plurality of components 12 and the fluid circuit to accomplish various tasks including, for example, pumping, cleaning, heating, sanitizing, and the like. Additional arrangements of the one or more additional components besides those shown in FIG. 1 that are known in the art are also contemplated.

Still referring to FIG. 1, in some embodiments, the user device 22 can interface with the central controller 20 either directly over a local area network, or via a network N. Similarly, the user device 22 and/or the central controller 20 can interface with the cloud server 24 over the network N so as to control one or more of the plurality of components 12 and/or to monitor a health thereof as described in more detail below. Although FIG. 1 depicts the central controller 20, the user device 22, and the cloud server 24, it should be noted that various communication methodologies and connections may be implemented to work in conjunction with, or independent from, one or more local controllers associated with each of the plurality of components 12 associated with the pool or spa system 10 (e.g., controller of the pump, controller of the heater, etc.).

Figure 2:
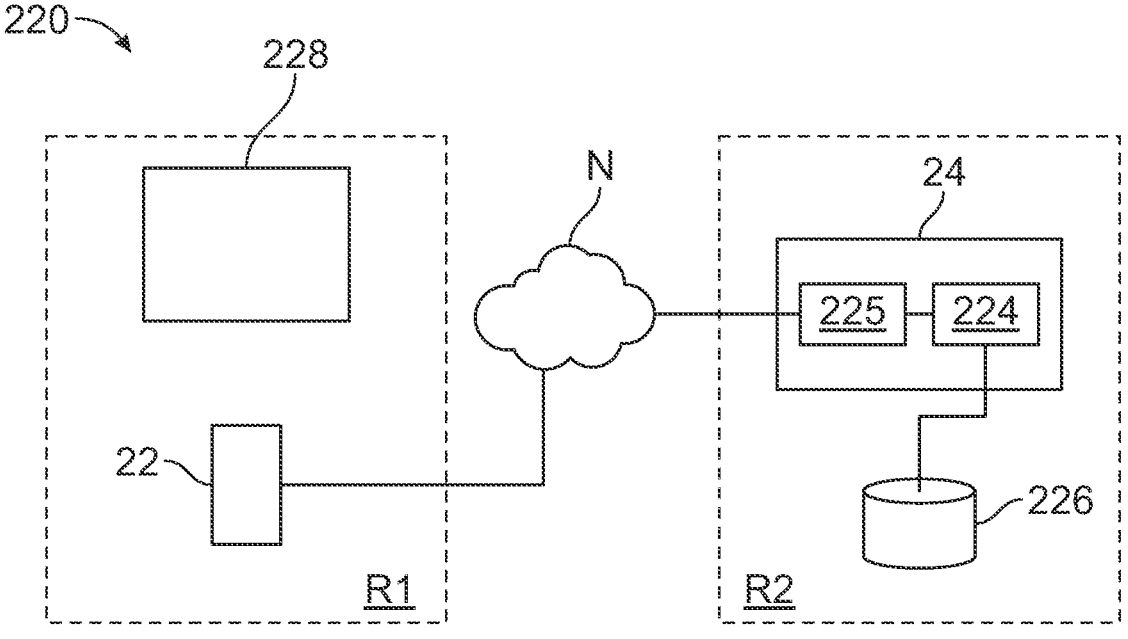
FIG. 2 is a block diagram of a pump health monitoring system portion of the connected pool system of FIG. 1 according to disclosed embodiments.

FIG. 2 illustrates a pump health monitoring system 220 according to disclosed embodiments. As seen in FIG. 2, the pump health monitoring system 220 can include the user device 22, the cloud server 24, and the network N of the pool or spa system 10 of FIG. 1. As seen in FIG. 2, the user device 22 can be deployable in a first region R1 proximate to one of the plurality of components 12 such as a water pump 228. In some embodiments, the water pump 228 is designed to be used to pump water and circulate water in connection with a pool, spa, or other aquatic application such as the pool or spa system 10 of FIG. 1. Additionally, or alternatively, in some embodiments, the pump 228 can be a water pump used for other application as known in the art.

Furthermore, as seen in FIG. 2, in some embodiments, the remote or cloud server 24 can be located at a second region R2 that is remote from the first region R1. In some embodiments, the cloud server 24 can include a programmable processor 224 and a network interface 225 and can be electronically coupled to a memory or database device 226. In some embodiments, the cloud server 24 can include program instructions that are stored on a cloud server non-transitory computer readable medium and that are executable by the programmable processor 224 to perform one or more of the methods described herein.

Figure 3:
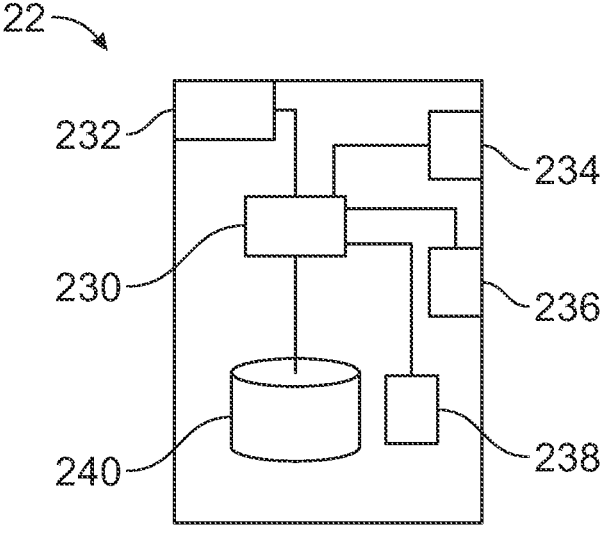
FIG. 3 is a block diagram of a schematic of a user device according to disclosed embodiments.

FIG. 3 illustrates a schematic view of the user device 22 according to disclosed embodiments. As seen in FIG. 3, the user device 22 can include a programmable processor 230 that is electrically coupled to a network interface 232, data capture devices 233, and/or a memory or database device 240. In some embodiments, the user device 22/network interface 232 can include a Wi-Fi, Bluetooth, cellular, or similar wired or wireless communication device used to communicate with the remote or cloud server 24 over the network N. For example, in some embodiments, the network interface 232 and the network interface 225 can create a communication link that operatively connects the user device 22 and the cloud server 24 over the network N. Furthermore, in some embodiments, the user device 22 can include program instructions that are stored on a user device non-transitory computer readable medium and that are executable by the programmable processor 230 to perform one or more of the methods described herein.

In some embodiments, the data capture devices 233 can include one or more of a microphone 234, a camera 236, and/or a vibration sensor 238. Furthermore, in some embodiments, one or more of the data capture devices 233 can be provided as a separate device that communicates with the programmable processor 230 via the network interface 232. For example, one or more of the microphone 234, the camera 236, or the vibration sensor 238 can be a separate device housed outside of the user device 22. In some embodiments, the vibration sensor 238 can include an accelerometer and/or gyroscope of the user device 22.

Figure 4:
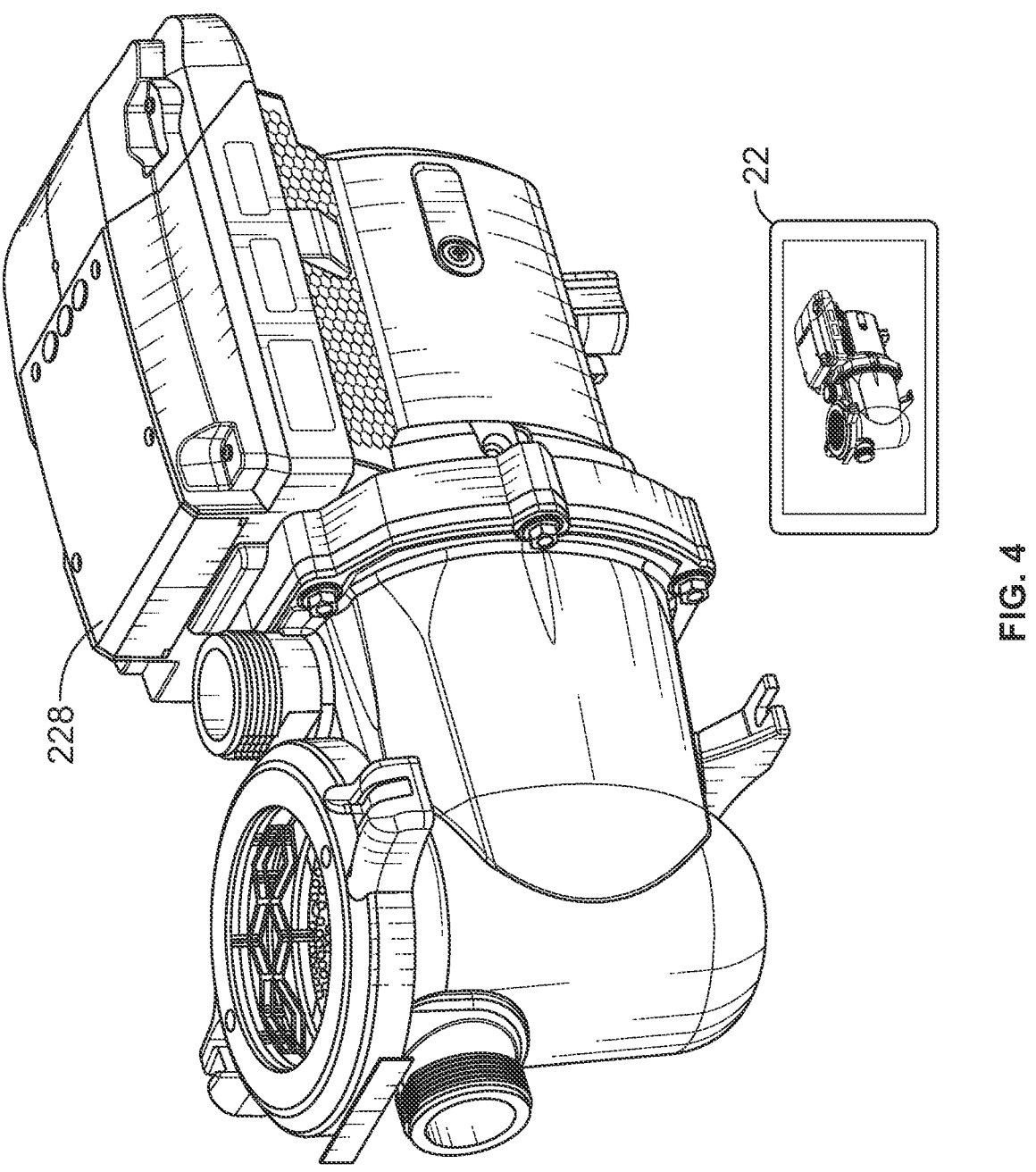
FIG. 4 is an isometric view of a pump and a user device according to disclosed embodiments.

In some embodiments, the plurality of data capture devices 233 can together collect a multiple variable data set relating to the pump device 228 and/or other ones of the plurality of components 12 (see FIG. 1). The multiple variable data set can include at least one or more identifying details of the pump device 228 and one or more operating details of the pump device 228. For example, in some embodiments, the microphone 234 can be configured to capture ambient audio of the pump 228 and the vibration sensor 238 can be configured to capture vibration patterns of the pump 228 when the user device 22 is placed on or proximate to the pump 228. Furthermore, as seen in FIG. 4 the camera 236 can be configured to capture one or more static images and/or video images of the pump 228 that are designed to be displayed on the use device 22. In some embodiments, the programmable processor 230 can be configured to receive one or more of the ambient audio, static image(s) and video image(s), and the vibration pattern from the microphone 234, the camera 236, and the vibration sensor 238, respectively. In some embodiments, the ambient audio, static images and video images, and the vibration patterns can each include embedded time stamps to enable the programmable processor 224 and/or the programmable processor 230 to synchronize each element in time and identify any simultaneously occurring events indicated by the multiple variable data set (e.g. the ambient audio, static images and video images, and the vibration patterns).

In some embodiments, in response to receiving the multi variable data set, the programmable processor 224 and/or the programmable processor 230 can be configured to extract the identifying details therefrom. For example, in some embodiments, the programmable processor 224 and/or the programmable processor 230 can be configured to extract the identifying details from the static images and/or video images in particular. In these embodiments, the identifying details can include, for example, markings on the pump 228 (e.g., text, barcode, QR code, or the like), a color of the pump 228, a shape of the pump 228, and or other distinct features that can be used to identify a specific make, model, and year of the pump 228. In other variations, one or more identifying characteristics may be input into the pump health monitoring system 2220 by a user. It should be noted that additional embodiments are contemplated where the identi-fying details include other data items in addition to or alternative to the static images and/or video images.

In some embodiments, the programmable processor 224 and/or the programmable processor 230 can be configured to the use the identifying details to retrieve from the memory device 240 and/or the memory device 226 a set of processing rules that are specific to the identity of the pump 228, and process the operating details of the multiple variable data set (e.g. the static images, the video images, the ambient audio, and the vibration patterns) with the set of processing rules to identify a current operational status of the pump 228. In some embodiments, when the current operational status indicates that the pump 228 is currently suffering one or more operational problems or operating in an undesirable condition, the programmable processor 224 and/or the pro-grammable processor 230 can be configured to initiate display of information documenting the one or more opera-tional problems on a display of the user device 22. In some embodiments, the information can include a listing of steps to correct and/or trouble shoot the one or more operational problems. Additionally, or alternatively, in some embodi-ments, the information can include contact information for, or activatable links to initiate contact with one or more service technicians that are capable of correcting the opera-tional problems.

In some embodiments, the current operational status can fail to indicate any operational problems with the pump 228, but the user device 22 can receive user input indicating a proposed issue that is instead consistent with normal opera-tion of the pump 228. In this instance, the programmable processor 224 and/or the programmable processor 230 can be configured to identify one or more replacement pumps or additional addon components for the pump 228 that could potentially limit or remedy the issue. For example, where the issue is related to a noise level that is associated with normal operation of the pump 228, the programmable processor 224 and/or the programmable processor 230 can be configured to identify a replacement pump that operates at a lower noise level and/or recommend addon components that would reduce the noise level of the pump 228.

In some embodiments, the pump 228 can be controllable by the programmable processor 224 and/or the program-mable processor 230. In these embodiments, the program-mable processor 224 and/or the programmable processor 230 can be configured to control the drive of the pump 228 or water flow to the pump 228 to correct the operational problems identified. For example, in some embodiments, the programmable processor 224 and/or the programmable pro-cessor 230 can be configured to dampen or compensate for frequency/harmonics of any noise identified such as by shifting the operation of the pump 228 to more tolerable frequencies, or by shifting the operational time of the pump 228 to a different schedule.

In some embodiments, the set of processing rules can be configured to direct the programmable processor 224 and/or the programmable processor 230 to identify one or more context variables from respective contents of the multiple variable data set such as from the static images and/or the video images. For example, in some embodiments, the programmable processor 224 and/or the programmable pro-cessor 230 can be configured to recognize problematic features like the presence of smoke, exterior damage to a housing of the pump 228, etc. Additionally or alternatively, in some embodiments, the programmable processor 224 and/or the programmable processor 230 can be configured to recognize the presence of turbulent water flow in a basket or cavitation of the pump, the presence of excessive debris in the pump basket to trigger a maintenance cycle alert, integ-rity of a pump seal by looking for water leakage (e.g., drops or dripping water, moisture on the exterior of the pump, and the like), and/or wiring issues such as insulation cracking/failure/black residue from arcing. In some embodiments, the camera 236 and/or another camera of the system 220 can include an infrared imaging capability. In these embodi-ments, the static images and/or the video images from the infrared capable camera can be used by the programmable processor 224 and/or the programmable processor 230 to identify temperature differences over time.

Furthermore, in some embodiments, the programmable processor 224 and/or the programmable processor 230 can be configured to detect vibration patterns from the static images and/or the video images. In these embodiments, the programmable processor 224 and/or the programmable pro-cessor 230 can be configured to supplement or replace the vibration patterns identified from the vibration sensor 238. For example, in some embodiments, the programmable processor 224 and/or the programmable processor 230 can be configured to corelate the vibration patterns identified from the static images and/or the video images with the vibration patterns from the vibration sensor 238 to more accurately determine the degree of vibration in the pump 228. Additionally or alternatively, in some embodiments, the programmable processor 224 and/or the programmable pro-cessor 230 can be configured to compare the vibration patterns from the vibration sensor 238 to any vibration patterns identified in the static images and/or the video images to verify any equipment issues identified from the vibration patterns received form the vibration sensor 238.

In some embodiments, the set of processing rules can be configured to direct the programmable processor 224 and/or the programmable processor 230 to identify the current operational status of the pump device 228 by first identifying one of a plurality of multivariable groups stored in the memory device 226 and/or the memory device 240 that best matches the operating details, and then identifying the current operational status as a respective known operational status associated with the one of the plurality of multivari-able groups. For example, the set of processing rules can be configured to direct the programmable processor 224 and/or the programmable processor 230 to combine the one or more context variables, the ambient audio, and the vibration patterns into a comparison group, identify one of the plu-rality of multivariable groups stored in the memory device 226 and/or the memory device 240 that best matches the comparison group, and identify the current operational sta-tus as a respective known operational status associated with the one of the plurality of multivariable groups. In some embodiments, the plurality of multivariable groups can include a large number of groupings of historical context variables, historical audio patterns, and historical vibration patterns that correspond to numerous known historical operational statuses such as a pump motor failure, cavita-tion, internal blocking, etc. When the comparison group representing the current one or more context variables, the ambient audio, and the vibration patterns is matched to the one of the plurality of multivariable groups, there is a high degree of certainty that the pump 228 is currently experi-encing the pump motor failure, cavitation, internal blocking, etc. associated with the closest matching one of the plurality of multivariable groups. In some embodiments, a best match can include one or more variables deviating from a baseline position by an amount that corresponds to a specific failure mode. For example, in some embodiments, a low amount of vibration and a high pitch noise combined at one frequency set can indicate an issue with a failing bearing, while a high amount of vibration and a low pitch noise can indicate a cavitation issue etc.

Various embodiments for identifying the closest matching one of the plurality of multivariable groups are contemplated. For example, in some embodiments, the programmable processor 224 and/or the programmable processor 230 can be configured to do an autocorrelation with images stored in the memory device 226. In some embodiments, the multivariable autocorrelation can require a greater number of images of the typical failure modes for the system 220 than when executing only a single variable correlation. In some embodiments, Fast Fourier transformations can be used to either filter out waveform characteristics that are not of interest or to extract the areas of interest. Additionally, in some embodiments, the programmable processor 224 and/or the programmable processor 230 can identify a baseline waveform for the customer and then look for future changes. This process helps to calibrate the system 220 and enable the programmable processor 224 and/or the programmable processor 230 to better look for issues specific to the pump used by the customer.

In some embodiments, the set of processing rules can be configured to direct the programmable processor 224 and/or the programmable processor 230 to assess each item of the multiple variable data set individually based on different respective data types. For example, the set of processing rules can be configured to direct the programmable processor 224 and/or the programmable processor 230 to filter the multiple variable data set into a plurality of subsets that each correspond to a different respective data type and identify a respective one of a plurality of known variables stored in the memory device 226 and/or the memory device 240 that best matches each one of the plurality of subsets. Finally, the set of processing rules can be configured to direct the programmable processor 224 and/or the programmable processor 230 to identify the current operational status as a combination of respective known operational statuses associated with the respective one of the plurality of known variables identified as the best match for each one of the plurality of subsets.

In the embodiments where the multiple variable data set includes the static images, the video images, the ambient audio, the vibration patterns, and or the one or more context variables derived therefrom, the set of processing rules can be configured to direct the programmable processor 224 and/or the programmable processor 230 to combine the one or more context variables into a comparison group, identify one of a plurality of known context variable groups stored in in the memory device 226 and/or the memory device 240 that best matches the comparison group, identify one of a plurality of known ambient audio recordings stored in in the memory device 226 and/or the memory device 240 that best matches the ambient audio captured by the microphone 234, identify one of a plurality of known vibration patterns stored in in the memory device 226 and/or the memory device 240 that best matches the vibration patterns captured by the vibration sensor 238, and identify the current operational status as a combination of respective known operational statuses associated with the one of the plurality of known context variable groups, the one of the plurality of known ambient audio recordings, and the one of the plurality of known vibration patterns. For example, in embodiments where one of the respective known operational statuses indicates only a pump motor failure and another one only indicates an internal blockage or indicates both the internal blockage and the pump motor failure, the programmable processor 224 and/or the programmable processor 230 will identify the current operational status as including both the pump motor failure and the internal blockage.

In some embodiments, the set of processing rules a can be derived from a machine learning training procedure wherein (1) training versions of the multiple variable data set (e.g. training static images, training video images, training ambient sounds, and/or training vibration patterns) that are associated with various known operational states of pump devices are input into the programmable processor 224 and/or the programmable processor 230, (2) the programmable processor 224 and/or the programmable processor 230 output a best guess operational state from processing the training versions of the multiple variable data set, (3) the programmable processor 224 and/or the programmable processor 230 modify the set of processing rules based on whether the best guess operational state matches or fails to match the known operational state associated with the input training versions of the multiple variable data set, and (4) the previous steps are iterated until the set of processing rules reliably identify the correct operational state based on the provided versions of the multiple variable data set. Furthermore, in these embodiments, the set of processing rules can additionally be updated based on feedback documenting whether the current operational status output by the programmable processor 224 and/or the programmable processor 230 in response to the actual multiple variable data set (e.g. the static images, video images, ambient sounds, and/or vibration patterns received respectively from the camera 236, the microphone 234, and/or the vibration sensor 238) is accurate.

In some embodiments, the set of processing rules can include a multiple stage analysis having a first stage and a second stage. In these embodiments, the second stage can include one or more of the processes described above to identify the current operating status of the pump 228 and the second stage uses analysis of the operating details (e.g. the ambient sounds, and/or vibration patterns from the microphone 234 and/or the vibration sensor 238, respectively) to determine whether the pump 228 is operating in a sufficiently abnormal fashion to trigger the second stage. For example, in some embodiments, the first stage can include the programmable processor 224 and/or the programmable processor 230 (1) comparing the operating details such as the ambient sounds, and/or vibration patterns from the microphone 234 and/or the vibration sensor 238 respectively to normal operating details such as normal operating sound and vibration patterns stored in the memory devices 226 and/or 240 to identify an amount of divergence therebetween, and (2) triggering the second stage when the level of divergence exceeds a predetermined threshold. Using this multiple stage process can limit the use of the more resource intensive second stage process to situations where the process is more likely to identify an operational problem with the pump 228. In particular, in some embodiments, this process can be employed where the first stage is performed entirely or primarily by the programmable processor 230 of the user device 22 and the second stage is performed entirely or primarily by the cloud server 24.

The embodiments disclosed herein are also directed to a method 300 for monitoring health of a pump system such as shown in the flow diagram of FIG. 5. As seen in FIG. 5, in some embodiments, the method 300 can include the programmable processor 224 and/or the programmable processor 230 receiving the multiple variable data set relating to the pump device 228, as in 320. Then, the method 300 can include the programmable processor 224 and/or the programmable processor 230 extracting the identifying details of the pump device 228 from the multiple variable data set, as in 322. Next, the method 300 can include the programmable processor 224 and/or the programmable processor 230 determining the identity of the pump device 228 from the identifying details, as in 324. Then, the method 300 can include the programmable processor 224 and/or the programmable processor 230 retrieving the set of processing rules that are specific to the identity of the pump device 228, as in 326. Next, the method 300 can include the programmable processor 224 and/or the programmable processor 230 processing the operating details with the set of processing rules to identify the current operational status of the pump device 228, as in 328.

Then, the method 300 can include the programmable processor 224 and/or the programmable processor 230 determining whether the current operational status indicate the pump device 228 is currently experiencing the one or more operational problems, as in 330. When the current operational status indicates that the pump device 228 is currently experiencing the one or more operational problems, the method 300 can include the programmable processor 224 and/or the programmable processor 230 initiating a corrective action, as in 322. Various embodiments for the corrective action are described herein and include at least initiating the display of the information documenting the one or more operational problems on the display of the user device 22 and/or controlling the drive of the pump 228 or water flow to the pump 228 to correct the operational problems identified.

However, when the current operational status fails to indicate that the pump device 228 is currently experiencing the one or more operational problems, the method 300 can include the programmable processor 224 and/or the programmable processor 230 ending the method 300, as in 334. In some embodiments, rather than ending the method 300, as in 334, the method 300 can include providing one or more remedial actions that would correct the proposed issue received by the programmable processor 224 and/or the programmable processor 230 that is consistent with normal operation of the pump device 228. As described above, the one or more remedial actions can include identifying one or more of replacement pumps and additional addon components for the pump device 228 that will limit or remedy the proposed issue.

It should be noted that while the systems and methods disclosed and described above with respect to FIGS. 2-5 are directed to monitoring the health of the pump device 228, similar systems and methods are contemplated with respect to additional ones of the plurality of components 12 of the pool or spa system 10 of FIG. 1 as would be understood by those of ordinary skill in the art.

Additionally, the embodiments described herein are further directed an improved system and methodology for using sensor data from underwater systems to monitor the health of individual underwater structures and changes to the reservoirs in which systems are installed. These embodiments represent an advancement over the prior art for several reasons, including that the systems and methods are capable of simultaneously monitoring and predicting changes in reservoir conditions and conditions within individual structures. The embodiments can include measuring the operation and condition of components within an underwater system, accumulating these measurements across a field of the underwater structure, performing statistical analysis on the accumulated measurements, and producing one or more selected outputs. As used herein, the term "health indices" refers to an expression of the condition of components within an underwater system, where the condition is determined by an assessment of data produced by sensors within a particular underwater structure.

These embodiments relate to monitoring of the underwater structure in order to avoid sudden halts in the operation and to provide planned maintenance, such as replacements or repairs before a critical situation occurs. This advantage can be accomplished by measuring one or more values that are used to compute chosen indices indicating the status of the equipment. The measurements and/or the indices are then transmitted to a control unit that is designed to extrapolate to find the most likely development of the indices and to predict the values, and through this, calculate a time to service or replace or maintain the equipment. Thus, the maintenance may be performed before the underwater device stops operating.

In an embodiment, an assembly that can evaluate an operational state of the underwater structure in a dependable and repeatable way is provided. The health monitoring of the operational integrity of underwater equipment, in real-time, such that deterioration/degradation can be monitored and assessed with trends and comparisons being made and allows for targeted preventative maintenance to be conducted before failure occurs. Moreover, unexpected failures can be mitigated, allow for the planning of preventative maintenance, and aid in the diagnosis of faults. However, should sudden failures occur, the data obtained from the condition monitoring system also allows for the efficient locating of faults so that remedial actions can be targeted, which again saves time and resources.

Even if the terms "operational value, operational parameter, location, derivative, part, compensating action, control unit, cloud server unit, measuring device, sensor and fiber" are used in the singular or in a specific numeral form in the claims and the specification the scope of the invention should not be restricted to the singular or the specific numeral form. It should also be noted that one or a plurality of the above-mentioned structure(s) may be provided.

The underwater system includes devices or equipment that are located in water during operation (e.g., at least partially or entirely submerged). The underwater devices or equipment may be used in any harsh environment and may be embodied as an electrical connector and/or penetrator or advantageously as a wet connector/penetrator, or as a connector part. Moreover, the underwater devices or equipment are advantageously employed in a high voltage application, and also may be used in a medium or low voltage application.

Furthermore, the operational parameter can include a physical parameter, like pressure, temperature, current, voltage, etc. and the operational value can include an absolute or differential measurement or number obtained for one parameter. The plurality of operational values as used herein refers all to the similar parameters gathered or provided at different points in time. Moreover, a selected location should be understood as a location where condition monitoring is especially of interest or relevant.

Further still, a derivative as used herein means a result of an operation performed on the operational value or the plurality of operational values. The operation may be any operation feasible for a person skilled in the art, like a mathematical operation. The derivative may be, for example, a specific difference between at least two values or a special gradient of several values, or a selected pattern of several values. In embodiments, the term "predefined"

should be understood as "selected beforehand" and/or as "being saved in a control unit to be recalled for the comparison". A reference as used herein may be any reference value or values feasible for a person skilled in the art. The reference may be a single value or a plurality of values or a specific correlation of several values.

According to an embodiment, the reference defines an abnormal behavior of the device and/or a part thereof. As a result, unstable and critical conditions of the device can be identified, and suitable measures can be initiated to stop or undo problem(s). Abnormal behavior as used herein means a condition where an action should be initiated to act on the underwater device or its current operational state and/or when the operation of the underwater device deviates from an acceptable, secure, or ideal operation.

In a further embodiment, the system activates at least one compensating action by the sensor system in case of detection of abnormal behavior of the underwater system and/or a part thereof. Hence, a suitable measurement can be taken to prevent an un-advantageous and/or a detrimental operation and thus possible damage of the underwater device or parts thereof. In this context, a "compensating action" as used herein is an action that alters operation of the underwater device or the system to correct the abnormal behavior and/or to limit or prevent damage to the underwater device or the system from the abnormal behavior. The compensating action may be any action feasible for a person skilled in the art, like a de-energizing of the underwater device, an initiation of a tighter maintenance regime, activation of a maintenance action, especially a preventative maintenance action, a reduction of a current for the underwater device. The compensating action can be actuated or triggered by any mechanism or actor suitable for a person skilled in the art, like from a control system and/or a person monitoring a control system.

The operational parameter may be any parameter feasible for a person skilled in the art. Advantageously, the operational parameter is a parameter selected out of the group of one or more of a temperature, pressure, humidity, a position, an electrical value (like the current, voltage, or resistance), or quality of fluid. Thus, a wide variety of different situations and operational scenarios can be monitored.

The temperature may be sensed using a temperature sensor, or a thermocouple sensor, a thermistor sensor, a resistance temperature detector, a thermometer, an IR temperature sensor, a semiconductor-based sensor, or another commercially available temperature measuring device. The pressure may be sensed using a pressure sensor or using a potentiometric, a capacitive, a piezoelectric, a strain gauge based, or another commercially available pressure measuring device. The measurement may, for example, be achieved by measuring one or more electrical properties (such as conductance, capacitance, inductance, etc.) using flow, current sensor, vibration etc. The measured value, which could be permittivity, is compared with a database value stored at the cloud server or in the control unit, and a relative measurement is obtained.

Temperature increases may lead to aging and degradation of insulating and sealing components, particularly polymers, resulting in reduced performance and potentially premature failure. Severe pressure differentials may lead to rupture of compensating diaphragms or failure of sealing elements resulting in water ingress.

In an embodiment, the same parameter is monitored at different locations of the underwater device. Hence, the overall integrity of the underwater device can be monitored more precisely. In this context, "several locations" is defined as more than one location. In other words, different parameters may be monitored at the same time and/or the same location. Hence, a more accurate current state of the underwater device can be provided. In this context, several parameters are intended to mean more than one parameter.

Additionally, certain dynamic changes allow the system to react to its environment and thus initiate sensors to work in an optimized way under such conditions. When the data is provided by the sensor system from one or more locations, it is sent to the control unit for analysis using multiple methods to deduce and calculate the current situation of the underwater system. The results of the provided data and/or the plurality of provided data and/or at least one value derived from the data and/or at least one derivative derived from the plurality of provided data defines the current operational state of the underwater system.

Furthermore, the system includes a control unit for determining the operational state of the underwater system with the help of a statistical method. The statistical method may be any method suitable for a person skilled in the art, like the use of a statistic estimator, a regression analysis, etc. The operational state of a part of several parts of the underwater system may be determined in conjunction with a statistical method specifically designed to determine the operational state.

According to a further aspect of an embodiment, a system for monitoring the health of the underwater system is provided. The system comprises a sensor unit designed to measure various parameters of the underwater structure. A control unit is communicatively coupled to the sensor unit to process the data provided by the sensor unit. The sensor unit may be removably attached to one or more locations of the underwater structure. Further, a local display unit is connected to the control unit to presents the information from the control unit. The control unit can process the information and send alerts or notifications. The system uses a remote device to monitor the health of the underwater structure at an end user/end user device. The remote device is communicatively coupled to the control unit of the system.

A safe, reliable, and failure-proof operation of the detachable sensor unit can be provided. The monitoring of the operational integrity of a connector underwater device, equipment on one or more places, in real-time, such that deterioration/degradation can be monitored and assessed with trends and comparisons being made, allows for targeted preventative maintenance to be conducted before failure occurs. Moreover, unexpected failures can be mitigated, allowing for the planning of preventative maintenance, and aiding in the diagnostic of various faults in power or communication systems employed in the underwater system. However, should sudden failures occur, the data obtained from the condition monitoring system should also allow for the efficient location of faults so that remedial actions can be targeted, again saving time and resources.

According to a still further aspect of an embodiment, an underwater system may comprise at least a submersible pump, hydraulic hose, subsea unit, or pool cleaners.

In an embodiment, the sensor unit comprises one or more of a temperature sensor, a pressure sensor, a humidity sensor, a position sensor, and/or a sensor for monitoring an electrical value. A wide variety of parameters can be detected with well-known principles allowing a reliable measurement.

Accordingly, the remote monitoring of the condition of the underwater structure to provide enhanced feedback and abnormal condition detection is provided. The embodiment, through modeling of the measured parameters, provides early warning and diagnostic information, to enable preventative actions to be undertaken or maintenance to be scheduled. The embodiment may be used with existing subsea installations, using the sensors already present, or new installations could be used.

There are various benefits to the embodiments such as a decrease in downtime in production due to scheduled maintenance, a reduced cost of unplanned interventions, less experienced operators are required to operate the system, faster response times in reacting to maintenance or emergency situations, or better visibility of system performance/status and the ability to share data with the user and other interested parties, if required.

Figure 6:
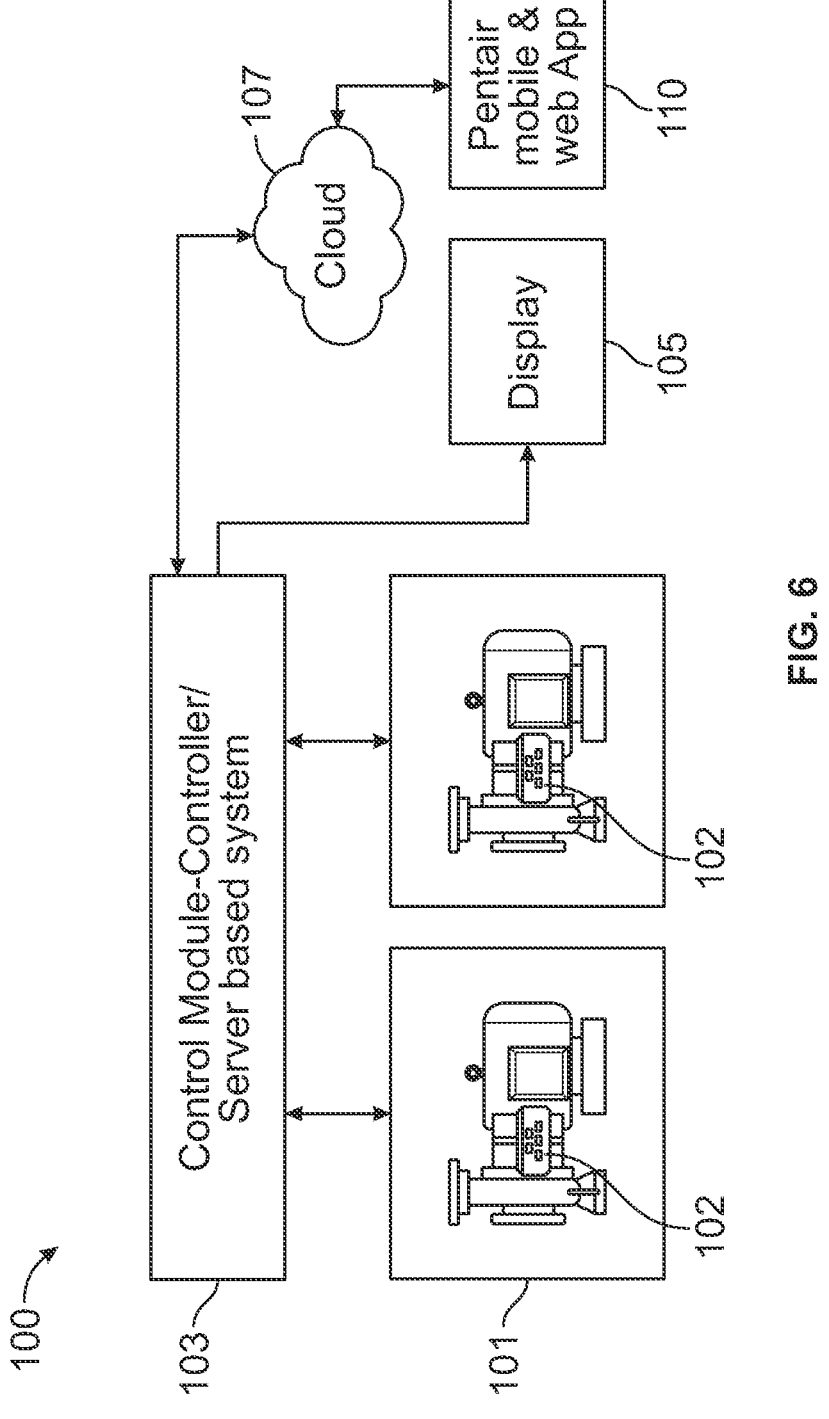
FIG. 6 is a schematic diagram of a sensor system according to disclosed embodiments.

FIG. 6 illustrates a system 100 having an underwater structure 101 such as a submersible pump, a hydraulic hose, a subsea unit, a pool cleaner, or any other equipment, connected to a control unit 103 or control module or controller or server-based system including for example the central controller 20, the user device 22, and the cloud server 24 of the pool or spa system 10 shown in FIG. 1. A sensor unit 102 is removably attached to the underwater structure 101 and is designed to monitor the health and diagnostics characteristics of the structure 101. More particularly, the sensor unit 102 consists of one or more sensors. The sensor unit 102 can include different types of sensors with one or more of the same type of sensor. The sensor unit 102 can collect the data from the underwater structure 101 by placing the sensor unit 102 in more than one location based on the diagnostics part of the underwater structure 101. Multiple sensors can be installed based on the size, requirements, and complexity of the system 100 so as to collect accurate information. The sensor unit 102 can comprise one or more of a temperature sensor, pressure sensor, gyro, accelerometer, vibration sensor, flow sensor, current sensor, voltage sensor, power sensor, energy sensor, or combination thereof. Moreover, the sensor unit 102 can easily be affixed to the structure 101 using an attachment mechanism such as conductive glue or magnets on any surface such as metal or the plastic of the system 100. The sensor unit 102 can also be mounted on one or more portions of the underwater structure 101 with an attachment mechanism such as a small belt, screw, clamp, or clip. This sensor unit 102 is designed to be removed and used for other products that have similar features or functions.

The sensor unit 102 can further include different types of sensors to collect the information of various parameters and send data to the control unit 103 or other similar device as described herein through a wired or a wireless method. The control unit 103 then processes the information provided by the sensor unit 102 and sends alerts or notifications to a remote device 110 installed at an end user and/or end user device (e.g., phone, computer, monitor, or the like).

The data from the sensor unit 102 can be collected by the control unit 103 and processed using a software algorithm to determine the health of the underwater structure 101. If some of the parameters deviate from known normal behaviors of the underwater structure 101 after processing, the control unit 103 will generate warning messages and display them locally on a display unit 105 and/or at a remote location such as on a user device. Additionally or alternatively, in some embodiments the software algorithm used to determine the health of the underwater structure 101 can include the multiple variable data set analysis systems and methods described above in connection with at least FIGS. 2-5. For example, in some embodiments, the software algorithm can include retrieving a set of processing rules specific to the underwater structure 101 and apply the set of processing rules to identify one of a plurality of multivariable groups stored in a memory device of the control unit 103 that best matches the data from the sensor unit 102 and identify the health of the underwater structure 101 as a respective known health status associated with the one of the plurality of multivariable groups. Additionally or alternatively, in some embodiments, the set of processing rules can direct the control unit 103 to filter the data from the sensor unit 102 into a plurality of subsets that each correspond to a different respective data type (e.g. different subsets for temperature sensor data, pressure sensor data, gyro data, accelerometer data, vibration sensor data, flow sensor data, current sensor data, voltage sensor data, power sensor data, energy sensor data, etc.). After filtering, the set of processing rules can direct the control unit 103 to identify a respective one of a plurality of known variables stored in a memory device that best matches each one of the plurality of subsets and identify the current health status as a combination of respective known health statuses associated with the respective one of the plurality of known variables identified as the best match for each one of the plurality of subsets.

Further, in some embodiments, the data from the sensor unit 102 is transmitted over a cloud 107 by the control unit 103. The remote device 110 is communicatively coupled to the control unit 103 to monitor the health of the underwater structure 101 at a user end. The remote device 110 uses a web application in a handheld device to communicate with the underwater structure 101 via the cloud 107. The handheld device may include, for example, a mobile phone, a laptop, an iPad, or a computer, etc. The alerts or notifications are sent remotely to customers from cloud 107 based services. The control unit 103 is connected via a wired medium or through a wireless medium. Also, the units can be interfaced, by the control unit 103 or controller with the external environment using wired—UART, SPI, USB, MODBUS, RS485/422/232, etc., or wireless connectivity technology—such as Bluetooth, ZigBee, WIFI, LoRaWAN, cellular-GSM, CATM1, NBIOT, etc. The system 100 is therefore designed to provide preventive and predictive maintenance in real-time.

Furthermore, the control unit 103 may be a processor or a computer that is communicatively connected to a non-transient computer-readable medium embodying computer memory, upon which one or more software programs are stored. The software programs, upon execution by the control unit 103, facilitates the operation of the system 100 to carry out one or more of the functions as disclosed herein. The control unit 103 is communicatively connected to the display unit 105. The display unit 105 may be a liquid crystal display (LCD) or a computer screen or other known types of graphical displays.

Known prior art systems are not able to detect behavior change of underwater systema due to aging, heating, or if a disturbance occurs in assembly during operation due to some water turbulence. Using the sensor unit 102, the user can monitor the overall health of the system 100 and diagnose if there is any disturbance of the assembly such as vibrations, an overloaded condition or heating issues, etc.

Figure 7:
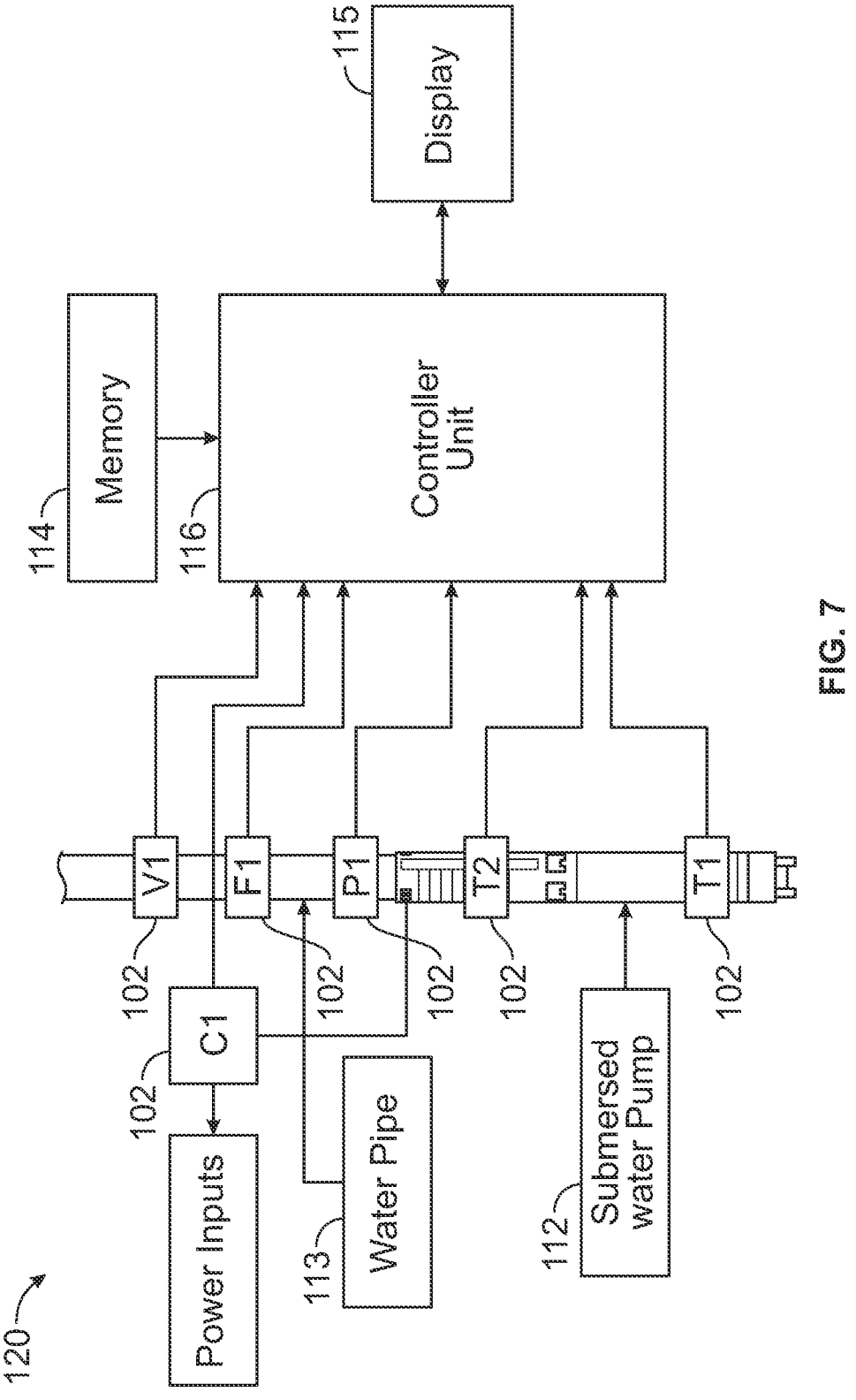
FIG. 7 is a system diagram showing multiple sensors employed over an underwater structure according to disclosed embodiments.

FIG. 7 depicts an embodiment of a system 120 described herein. The system 120 includes an underwater structure provided in the form of a submersible water pump 112. As described above, the sensor unit 102 can include different types of sensors with one or more of the same type of sensor being attached to the submersible water pump 112. The sensor unit 102 may collect the data from the underwater structure i.e. submerged water pump 112 by placing the sensor unit 102 on more than one location of the pump 112. In this instance, the sensor unit 102 can comprise a temperature sensor, pressure sensor, gyro, accelerometer, vibration sensor, flow sensor, current sensor, voltage sensor, power sensor, energy sensor, or their combination thereof. The sensor unit 102 is provided on the submerged water pump 112 and a water pipe 113 as further depicted in FIG. 7. The sensor unit 102 can include one or more of a vibration sensor (V1), a current sensor (C1), a flow sensor (F1), a pressure sensor (P1), and temperature sensors (T1, T2). The vibration sensor (V1) measures vibration levels to identify electromagnetic or mechanical imbalance, loose components, rubbing parts, bearing failure, or resonance. The current sensor (C1) measures current flowing through the system using a non-intrusive method. The flow sensor (F1) measures flow of water that is pumped by a motor of the submerged water pump 112 and determines the actual health of the motor by determining if the flow rate is unexpectedly high or low based on the particular application and various threshold metrics. The pressure sensor (P1) monitories pressure in air compressors, irrigation systems, and heat exchangers that all use pumps to push air or water through their respective systems. The sensor unit 102 helps to overcome the faults and monitors the submerged water pump 112. Further, the temperature sensor (T1) monitors the temperature and helps to detect any abnormal temperature rise due to any malfunction or failure.

Other sensors such as voltage and power, also monitor the input voltage and calculate the power factor of a motor of the pump 112 using both current and voltage values of the system 120. Moreover, the sensor unit 102 may be attached with an attachment mechanism like conductive glue or magnets on any surface such as metal or plastic portions of the pump 112. The sensor unit 102 can also be mounted on the water pump 112 surfaces with a small belt or screw or a clamp or clip-on. The sensor unit 102 can also be removed and used for other products that have similar features or functions. Further, this sensor unit 102 can be detached after the operation is completed and can be re-used for another device or in a system for health monitoring in a similar arrangement.

The sensor unit 102 is further connected to a controller unit 116. The data is collected by the controller unit 116 and the controller unit 116 processes the data using a software algorithm to determine the health of the water pump 112. As described above, in some embodiments the software algorithm used to determine the health of the water pump 112 can include the multiple variable data set analysis systems and methods described above in connection with at least FIGS. 2-5. For example, in some embodiments, the software algorithm can include retrieving a set of processing rules specific to the water pump 112 and applying the set of processing rules to identify one of a plurality of multivariable groups stored in a memory device 114 that best matches the data from the sensor unit 102 and, identifying the health of the water pump 112 as a respective known health status associated with the one of the plurality of multivariable groups. Additionally or alternatively, in some embodiments, the set of processing rules can direct the control unit 103 to filter the data from the sensor unit 102 into a plurality of subsets that each correspond to a different respective data type (e.g. different subsets for temperature sensor data, pressure sensor data, gyro data, accelerometer data, vibration sensor data, flow sensor data, current sensor data, voltage sensor data, power sensor data, energy sensor data, etc.). After filtering, the set of processing rules can direct the control unit 103 to identify a respective one of a plurality of known variables stored in the memory device 114 that best matches each one of the plurality of subsets and identify the current health status as a combination of respective known health statuses associated with the respective one of the plurality of known variables identified as the best match for each one of the plurality of subsets.

The controller unit 116 can include a processor or a computer that is communicatively connected to the memory device 114, which can include a non-transient computer-readable medium embodying computer memory upon which one or more software program is stored. The software programs, upon execution by the controller unit 116, facilitate the operation of the system 120 to carry out one or more of the functions as disclosed herein. The controller unit 116 is communicatively connected to the display unit 115. If some of the parameters provided by the sensor unit 102 are not normal or are out of context (or above or below a predefined threshold), the controller unit 116 will generate the warning messages or alerts to display them locally on the display unit 115, and/or on a remote device.

The graphical display unit 115 may include be a liquid crystal display (LCD) or other known types of graphical display. The controller unit 116 operates the graphical display unit 115 to locally present information regarding the processed data and features and/or other calculated parameters from the sensor unit 102 when operating the system 120. The processed data may be depicted in a graphical user interface (GUI) presented on the graphical display unit 115. The system 120 includes a display interface that forwards graphics, text, and other data from the communication infrastructure for display on the display unit 115.

With the implementation of the system 120 disclosed herein, the water pump 112 may be alerted to the occurrence and location of a fault. Furthermore, the display unit 115 can present visual representation of the fault and its location. Further still, the controller unit 116 may perform one or more of shutdown, replacement, maintenance, overhaul, and/or other service routines on the water pump 112 in a timely manner with minimal obstruction to an ongoing procedure in a job site such as a wellbore. Moreover, as the location of the fault is visually presented by the display unit 115, the controller unit 116 may utilize the location of the fault to identify a type of corrective action to be performed. Therefore, with the use of the system 120 disclosed herein, time and effort previously incurred with the maintenance of pumps may be offset thus saving costs to operate the pump 112.

The controller unit 116 is connected via a wired medium or through a wireless medium to various other components of the system 120. Also, the units can be interfaced, by the controller unit 116 with the external environment using wired—UART, SPI, USB, MODBUS, RS485/422/232, etc., or wireless connectivity technology—such as Bluetooth, ZigBee, WIFI, LoRaWAN, cellular-GSM, CATM1, NBIOT, etc.

Therefore, the systems 100 and 120 presented herein recognize the need to provide preventive and predictive maintenance in real-time. In comparison to prior art systems, the systems 100 and 120 provide better maintenance alerts using a single sensing unit or sensor system. The single sensing unit can be used for different machines to measure various parameters such as temperature and vibration from one machine and flow, pressure from another machine. Thus, the embodiment avoids any malfunctions, breakdowns, or faults in the underwater structure by using a single sensor system.

The advantages of this improved system only define real-time data from the sensor unit to monitor the underwater facility without any statistical failure rate etc. This gives the possibility to quickly adapt the system in response to sudden changes in the conditions of the underwater structure and to make predictions and preventive measures without any predetermined model describing the system or its components.

Accordingly, the systems described herein enable the remote monitoring of the condition of the underwater structure to provide enhanced feedback and abnormal condition detection. The embodiment, through modeling of the measured parameters, provides early warning and diagnostic information, to enable preventative actions to be undertaken or maintenance to be scheduled. The systems can be used with existing subsea installations, using the sensors already present, or new installations could be provided with the components described herein.

There are various benefits to the disclosed systems, such as, for example, a decrease in downtime in production due to scheduled maintenance, a reduced cost of unplanned interventions, less experienced operators are required to operate the system, faster response times in reacting to situations, or better visibility of system performance/status and the ability to share data with the user and other interested parties, if required.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A pump health monitoring system, comprising:
a plurality of data capture devices that together collect a multiple variable data set relating to a pump, the multiple variable data set including at least one or more identifying details of the pump and operating details of the pump; and
a first programmable processor that receives the multiple variable data set, extracts the identifying details from the multiple variable data set, determines an identity of the pump from the identifying details, retrieves a set of processing rules that are specific to the identity of the pump, and processes the operating details with the set of processing rules to identify a current operational status of the pump,
wherein, the first programmable processor initiates a display of information documenting one or more operational problems on a display device when the current operational status indicates that the pump is currently experiencing the one or more operational problems.

2. The pump health monitoring system of claim 1, wherein the set of processing rules direct the first programmable processor to identify one of a plurality of multivariable groups stored in a memory device that best matches the operating details and identify the current operational status as a respective known operational status associated with the one of the plurality of multivariable groups.

3. The pump health monitoring system of claim 1, wherein the set of processing rules direct the first programmable processor to:

filter the multiple variable data set into a plurality of subsets that each correspond to a different respective data type;
identify a respective one of a plurality of known variables stored in a memory device that best matches each one of the plurality of subsets; and
identify the current operational status as a combination of respective known operational statuses associated with the respective one of the plurality of known variables identified as a best match for each one of the plurality of subsets.

4. The pump health monitoring system of claim 1 wherein the set of processing rules includes a multi-stage process that includes:
a first stage that directs the first programmable processor to retrieve normal operating details that are specific to the identity of the pump and compare the operating details with the normal operating details; and
a second stage that identifies the current operational status of the pump.

5. The pump health monitoring system of claim 4, wherein the second stage is activated when an output of the first stage indicates that the operating details deviate from the normal operating details beyond a threshold amount.

6. The pump health monitoring system of claim 1, wherein the information documenting the one or more operational problems includes a listing of steps to correct and/or troubleshoot the one or more operational problems.

7. The pump health monitoring system of claim 1, wherein the information documenting the one or more operational problems includes contact information for, or activatable links to initiate contact with one or more service technicians that are capable of correcting the one or more operational problems.

8. The pump health monitoring system of claim 1, wherein, the first programmable processor identifies one or more replacement pumps and additional add-on components for the pump that will limit or remedy a proposed issue when the current operational status fails to indicate that the pump is currently experiencing the one or more operational problems, and the first programmable processor receives user input indicating the proposed issue that is consistent with normal operation of the pump.

9. A method for monitoring health of a pump system, the method comprising:
receiving a multiple variable data set, the multiple variable data set relating to a pump and including at least identifying details of the pump and operating details of the pump;
extracting the identifying details from the multiple variable data set;
determining an identity of the pump from the identifying details;
retrieving a set of processing rules that are specific to the identity of the pump;
processing the operating details with the set of processing rules to identify a current operational status of the pump; and
initiating a corrective action when the current operational status indicates that the pump is experiencing one or more operational problems.

10. The method for monitoring health of a pump system of claim 9, wherein the corrective action includes initiating a display of information documenting one or more operational problems on a display device.

11. The method for monitoring health of a pump system of claim 9, further comprising:

capturing the multiple variable data set with a plurality of data capture devices integrated into a user device.

12. A pump health monitoring system, comprising:

a user device including a user device processor, a first network interface, a plurality of data capture devices, and a user device non-transitory computer readable medium;

a cloud server including a cloud server processor, a second network interface, and a cloud server non-transitory computer readable medium;

a communication link that operatively connects the user device and the cloud server via the first network interface and the second network interface;

first program instructions stored on the user device non-transitory computer readable medium, the first program instructions being executable by the user device processor to cause the user device to perform the steps of:

capturing a multiple variable data set relating to a pump with the plurality of data capture devices, the multiple variable data set including at least identifying details of the pump and operating details of the pump;

sending the multiple variable data set to the to the cloud server via the communication link;

receiving information documenting one or more operational problems of the pump from the cloud server; and displaying the information documenting the one or more operational problems of the pump on a display of the user device; and second program instructions stored on the cloud server non-transitory computer readable medium, the second program instructions being executable by the cloud server processor to cause the cloud server to perform steps of:

receiving the multiple variable data set from the user device;

extracting the identifying details from the multiple variable data set;

determining an identity of the pump from the identifying details;

retrieving a set of processing rules that are specific to the identity of the pump from a memory device coupled to the cloud server;

processing the operating details with the set of processing rules to identify a current operational status of the pump; and sending the information documenting the one or more operational problems of the pump to the user device via the communication link when the current operational status indicates that the pump is experiencing the one or more operational problems.

13. The pump health monitoring system of claim 12, wherein the plurality of data capture devices include a microphone, a camera, and a vibration sensor, and wherein the multiple variable data set includes ambient audio of the pump collected by the microphone, at least one static image or video image of the pump collected by the camera, and a vibration pattern of the pump collected by the vibration sensor.

14. The pump health monitoring system of claim 13, wherein processing the operating details with the set of processing rules includes identifying one or more context variables from respective contents of the at least one static image and/or the at least one video image.

15. The pump health monitoring system of claim 14, wherein the pump is entirely submerged underwater.

* * * * *